United States Patent
Bosio et al.

(10) Patent No.: US 10,836,548 B2
(45) Date of Patent: Nov. 17, 2020

(54) MODULAR PACKAGING MADE OF PLASTIC MATERIAL FOR FOOD PRODUCTS READY FOR CONSUMPTION COMPRISING A MAIN CONTAINER AND A PLURALITY OF SECONDARY CONTAINERS INSERTED IN THE MAIN CONTAINER

(71) Applicant: SIRAP-GEMA S.p.A., Verolanuova (IT)

(72) Inventors: Luca Bosio, Verolanuova (IT); Victor Lopes Mascarenhas, Verolanuova (IT)

(73) Assignee: SIRAP-GEMA S.P.A., Verolanuova (IT)

( * ) Notice: Subject to any disclaimer, the term of this patent is extended or adjusted under 35 U.S.C. 154(b) by 151 days.

(21) Appl. No.: 15/791,716

(22) Filed: Oct. 24, 2017

(65) Prior Publication Data
US 2018/0127178 A1 May 10, 2018

(30) Foreign Application Priority Data

Nov. 10, 2016 (IT) .......................... 102016000113751
Feb. 14, 2017 (IT) .......................... 102017000016247

(51) Int. Cl.
*B65D 51/28* (2006.01)
*B65D 81/32* (2006.01)
(Continued)

(52) U.S. Cl.
CPC .............. *B65D 51/28* (2013.01); *A47J 47/02* (2013.01); *B65D 43/162* (2013.01);
(Continued)

(58) Field of Classification Search
CPC ........ B65D 51/28; B65D 51/246; B65D 1/36; B65D 2543/00055; B65D 2581/3432; B65D 81/3216
(Continued)

(56) References Cited

U.S. PATENT DOCUMENTS 5,826,718 A * 10/1998 Ahern, Jr. ................ B25H 3/02
206/372
6,021,903 A * 2/2000 Hanson .................. B65D 51/28
206/541
(Continued)

FOREIGN PATENT DOCUMENTS

DE          8629787 U1     12/1986
JP          H0644754 U     6/1994
WO          2011081677 A1  7/2011

OTHER PUBLICATIONS

Italian Search Report for Italian Appl No. 102016000113751(2 Pages) (dated Jun. 14, 2017).

*Primary Examiner* — Shawn M Braden
(74) *Attorney, Agent, or Firm* — Lucas & Mercanti, LLP

(57) ABSTRACT

Herein is described a plastic package for food or food products which are ready for consumption. The package includes a first container of larger size, for a main food component and a second container, of smaller size, able to separately contain a supplementary food component. The package is characterized by the fact that the first bottom and/or the first closure lid of the first container have a cavity open to the outside and conformed to constitute a housing compartment for the second container by at least partial insertion of said second container in the cavity of the first container.

11 Claims, 10 Drawing Sheets

(51) Int. Cl.
  *A47J 47/02*   (2006.01)
  *B65D 43/16*   (2006.01)
  *B65D 51/24*   (2006.01)

(52) U.S. Cl.
  CPC ....... *B65D 51/246* (2013.01); *B65D 81/3205* (2013.01); *B65D 2581/3432* (2013.01)

(58) Field of Classification Search
  USPC ........................................................ 220/521
  See application file for complete search history.

(56) References Cited

U.S. PATENT DOCUMENTS

| | | | |
|---|---|---|---|
| 8,317,024 B1* | 11/2012 | Persi ................... | B65D 21/023 |
| | | | 206/508 |
| 8,985,382 B2* | 3/2015 | Vernon .................. | A47G 19/06 |
| | | | 206/508 |
| 2012/0067009 A1* | 3/2012 | Bontrager .......... | B65D 43/0237 |
| | | | 53/467 |
| 2012/0321756 A1 | 12/2012 | Estabrook | |

\* cited by examiner

MODULAR PACKAGING MADE OF PLASTIC MATERIAL FOR FOOD PRODUCTS READY FOR CONSUMPTION COMPRISING A MAIN CONTAINER AND A PLURALITY OF SECONDARY CONTAINERS INSERTED IN THE MAIN CONTAINER

CROSS REFERENCE TO RELATED APPLICATIONS

This application claims benefit of priority from Italian Patent Application No. 102016000113751 filed Nov. 10, 2016, and from Italian Patent Application No. 102017000016247 filed on Feb. 14, 2017, the contents of each which are incorporated by reference.

FIELD OF THE INVENTION

The present invention refers to the field of packaging made of plastic material for food products ready for consumption whose components are to be kept separated during preservation and then to be mixed together upon packaging use to obtain a food product ready for consumption.

BACKGROUND OF THE INVENTION

As it is well known, over the past few years food products ready for consumption, such as for example ready salads, (the so called IV gamma), fruit salads, ready dishes and the like show a continuous increase in consumption, especially if they are offered to the consumer in a container which allow direct use (consumption) in both domestic and non-domestic context (for example in the office, at school or at the store).

In particular, ready salads packaged this way have become real meal replacement, since solid ingredients and condiments are added to the salad to constitute a light, healthy and at the same time nutritious meal.

According to a prior art packaging technology, packages for food products ready for consumption are constituted by a container for a main food component (for example salad) and by an insert in which cavities are formed for containing one or more further supplementary food components (loose enrichers), condiment sachets (for example oil and/or sauce sachets) and even pieces of cutlery, respectively. The insert is housed inside the container containing the main food component and the whole is sealed by a film or closure lid sealed to the upper rim of the container so as to allow the protection, preservation and transportation of the food packaged in this way.

At the time of consumption, the user removes the sealing film or lid from the upper rim of the container and pours the supplementary food components contained in the insert within the container as well as the condiments contained in the sachets, after opening of latter, so as to mix the whole to the main food component contained in the container and to form therefore the food product ready for consumption.

A package of this type has the undeniable advantage to keep food components and condiments constituting the food product separated from each other during preservation, thereby preventing problems connected to the alteration of organoleptic or nutritional nature which could otherwise easily occur if these ingredients would be packaged together, in direct contact with each other.

However, a package of this type has the disadvantage that the combinations among the main food component and the relative supplementary food components and/or condiments contained in the package are predetermined at the beginning by the producer and there is usually a small number of combinations that do not always meet the desires and tastes of the end consumer. Furthermore, a cross-contamination between the main food component and the supplementary food components within the package is sometimes possible even if an insert is provided for keeping the supplementary food components separated from the main food component. Such contamination is particularly problematic in the event of purchase of the package by subjects who are allergic or intolerant to one or more of the food components that have caused contamination.

Moreover, the use of the package described above in order to constitute the food product ready for consumption objectively requires many operations for the consumer such as in particular, as said above: removing the sealing film or lid from the container, overturning the insert for pouring the food component contained in the cavities of the container, opening the condiment sachets and pouring the relative contents in the container, mixing the ingredients.

It is totally clear that execution of the above operations is not much hygienic, if one considers that while overturning the insert it is really easy to spill its contents and/or the contents of condiment sachets out of the receiving container, as well as it is easy that part of the food product could go out of the already open container during the mixing of the ingredients.

Japanese patent application JP H06 44754 describes a modular package comprising a first container provided with bottom and lid, and a second container of smaller size compared to that of the first container, housed in a cavity formed in the lid of the first container. Two opposed grooves are also provided which are formed on the top of the lid in correspondence with the rim of the cavity of housing of the second container to facilitate the grab of the second container by the user. A similar modular package is also described in the patent application US 2012/321756.

OBJECTS AND SUMMARY OF THE INVENTION

A main object of the present invention is to provide a modular packaging for food products for consumption that allows one to increase significantly the number of possible combinations between the main food component and the supplementary food components and/or condiments packaged in separate containers and mixed in the use to form the food products at consumption, with the possibility for the end consumer to choose the appropriate combination depending on, for example, his/her own tastes and/or desires.

Another object of the present invention is to provide a modular packaging as described above, that has moreover structural and functional features such as to make the packaging particularly easy to use by the user, for example during constitution of the food product ready for consumption.

A further object of the present invention is to provide a packaging as described above that could be produced in an easy way and at low cost.

These and other objects are primarily reached through a package made of plastic material for food or food products ready for consumption, comprising a first container, of larger size, for a main food component, said first container comprising a first bottom and a first closure lid having a top part surrounded by side walls, and at least one second container, of smaller size, to separately contain a supplementary food component, said first container having at least one cavity open to the outside and formed on the top part of said first closure lid and conformed to constitute a housing compartment for said at least one second container by at least partial insertion of said at least one second container in said at least one cavity of said first container, said package being characterized by the fact that the closure lid of the first container has at least one groove formed as one-piece with said top part of the lid, each groove being formed in correspondence with said at least one cavity and each groove being in addition open or faced towards the corresponding cavity involving also a part of the side walls of the lid of the first container so as to be also open to the outside of the first container.

Preferably, in the package according to the invention, said at least one cavity is formed on the external side of the top part of the first closure lid of said first container.

Preferably, in the package according to the invention, in the first container and/or in the at least one second container, the bottom has a peripheral flange extended towards the outside on which is formed a rib extended along the perimeter and protruding upwards, and said lid has a peripheral flange on which is formed a spline protruding upwards and extended along the perimeter, said peripheral spline being formed in correspondence with said rib and having a shape substantially complementary to that rib so that, when the first container and/or said at least one second container is closed, said peripheral flange of the lid and said peripheral flange of the bottom result to be overlapped to each other and coupled by shape coupling between the complementary profiles of said rib and said spline.

Moreover, advantageously, in the first container and/or in the at least one second container, the peripheral flange of the bottom and/or the peripheral flange of the lid have at least one tab to facilitate opening the container by the user. Preferably, in the first container and/or in the at least one second container, the peripheral flange of the bottom and the peripheral flange of the lid have at least one pair of respective tabs protruding towards the outside and in staggered position with respect to each other, so as to facilitate opening of said first container and/or said at least one second container.

According to a particularly preferred embodiment, the peripheral flange of the bottom and the peripheral flange of the lid of the first container and/or of the at least one second container have, in correspondence with the opposed end parts of respective sides faced one on to the other, two pairs of respective tabs protruding towards the outside and in staggered position with respect to each other.

In the present invention, the first container and/or the at least one second container can be joined or not joined to each other through a hinge extended on a side or a part of the respective bottom and closure lid.

According to an embodiment of the present invention, the first container and/or the at least one second container is/are provided with a tamper-evident system or mechanism such that a partial or total removal thereof or damage thereof is hint of tamper of the package. In such embodiment, the hinge between the bottom and the lid can form part of the tamper-evident system of the respective container and the above mentioned tabs on the peripheral flange of the bottom and on the peripheral flange of the lid can be formed on the same side or part where the hinge is formed, possibly close to the latter.

According to an embodiment of the present invention, the first container and/or the at least one second container are made of a plastic material that is rigid, expanded with closed cells or expanded with substantially open cells chosen from, for example, polyethylene terephthalate (PET), polypropylene (PP), polystyrene (PS) and their copolymers, etc.

The main advantage of the package for food or food products ready for consumption according to the invention lies in the fact that, contrary to the known containers, the supplementary food components are packaged separately and externally to the containment compartment of the container for the main food component, in respective containers of smaller size which are coupled to the container for the main food component so as to form the whole end package. In this way, the end consumer can combine to the larger container, in which the chosen main food component is packaged, one or more smaller containers, each containing a supplementary food component chosen according to his/her own tastes and desires, obtaining thereby a whole package which contains separately packaged food ingredients desired for the constitution of the final food product at the time of consumption.

Moreover, thanks to the formation of grooves on the top of the lid of the first container in correspondence with corresponding cavities which besides being faced towards the corresponding cavities also involve a part of the side walls of the lid of the first container so as to be also open to the outside of the first container, the use of the modular package by the user is facilitated to a considerably greater extent compared to what taught by the above-mentioned prior art, in particular the extraction of the at least one second container from the first container at the time of composing the food product ready for consumption.

Advantageously, the package according to the invention can be available in both the assembled form, with the at least one second container containing the respective supplementary food component is already inserted in the first container containing the main food component, and in the form of kit of components wherein the at least one second container containing the respective supplementary food component is originally detached from the first container containing the main food component and insertable in the latter, in particular to make it possible for the consumer to combine supplementary food components contained in the second containers and the main food component contained in the first container depending on his/her own tastes and/or desires.

Preferably, in the package according to the invention, said at least one second container comprises a second bottom and a second closure lid.

Further features and advantages of the present invention will emerge more from the following description of a preferred example of realization of a package for food or food products ready for consumption according to the invention made with reference to the enclosed drawings which are given by a way of indication and non-limiting.

DETAILED DESCRIPTION

Figure 1:
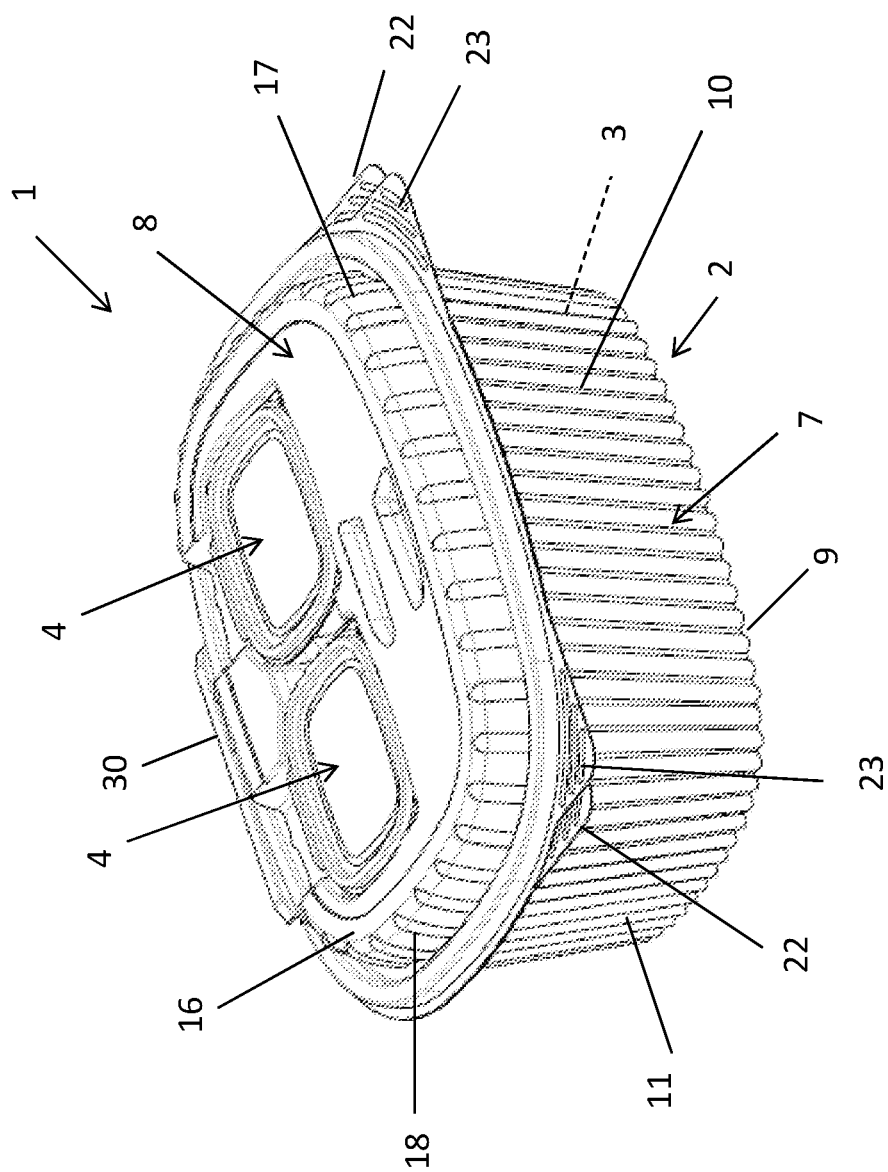
FIG. 1 shows a perspective view of a package for food products ready for consumption according to the invention.
Figure 2:
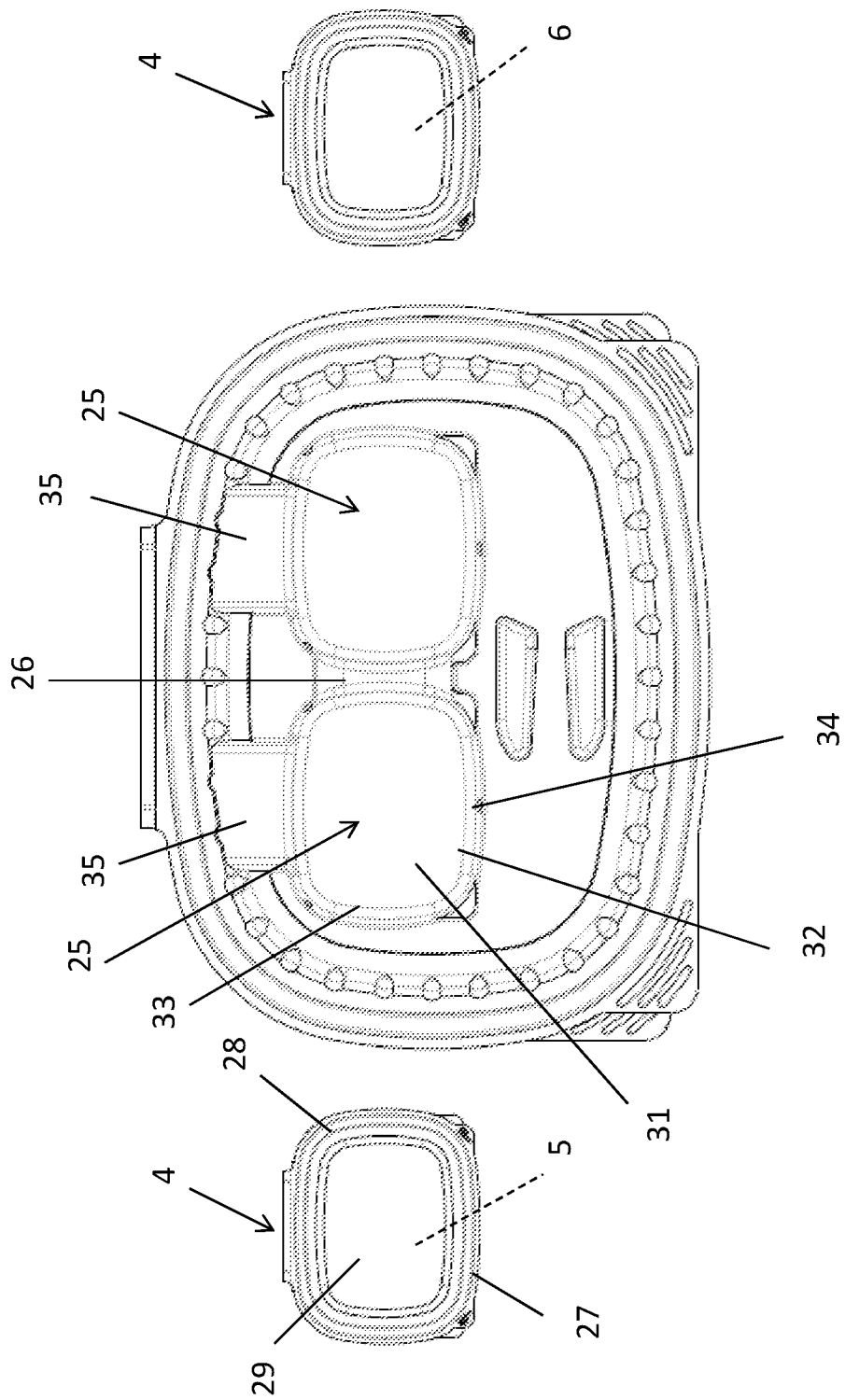
FIG. 2 shows a top view and with detached parts of the package of FIG. 1.
Figure 3:
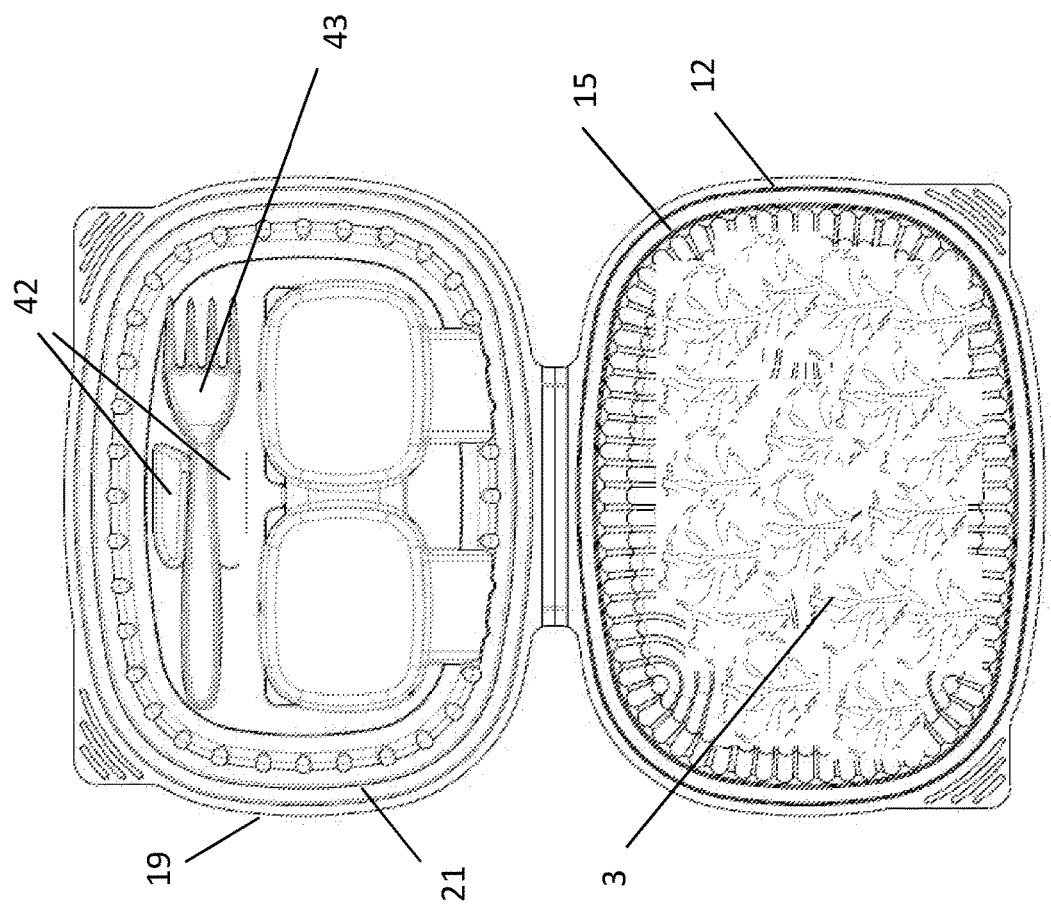
FIG. 3 shows a top view of a container of the package of FIG. 1 in the open configuration.

Hereinafter in the present description, the term "package" refers to a single container or to a group of containers that are related and provided as a unit, for example a single container or a group of different containers.

Hereafter in the present description, the terms "upper", "lower", "outside" and "inside" refer to the orientation of a particular embodiment as shown in the figure first numbered relative to said embodiment.

Moreover, it is to be understood that the technical features specifically described previously and hereinafter can be combined with each other, constituting further embodiments of the present invention which are not specifically described for concision reasons but which fall within the scope of the present invention.

Particularly, the present invention relates to a modular package comprising a first container, of larger size, able to contain a main food component (for example a food to flavor and/or to "enrich" with further food components), and at least a second container, of smaller size, able to separately contain a supplementary food component, for example a condiment and/or "enricher" of the main food component, wherein said at least one secondary container is inserted in the first container.

The package according to the invention as above can be provided in both the assembled form, with the at least one second container containing the respective supplementary food component already inserted in the first container containing the main food component, and in the form of kit of components wherein the at least one second container containing the respective supplementary food component is originally detached from the first container containing the main food component and is insertable in the latter.

By way of a non-limiting example, the present invention can be employed to contain vegetables or fruit pieces or cold pasta in the container for the main food component and further supplementary food components (for example liquids like condiments such as oil, vinegar, sauces) and solid food components (so called "enrichers") such as for example meat or fish pieces, separated from each other and separated from the main food component, in the smaller containers.

Upon package use, the supplementary food components contained in the smaller containers are individually mixed (dosed) in the food component contained in the container for the main food component in order to obtain a food product ready for consumption.

With reference to the above-mentioned figures, with 1 is indicated a package made in plastic material for food or food products ready for consumption according to the invention taken as a whole.

The package 1 comprises a first container 2, of larger size, able to contain a main food component 3, and a pair of second containers 4 of smaller size compared to the first container 2, able to contain respective supplementary food components 5 and 6 separately from each other and separately from the main food component 3.

The first container 2 comprises a substantially rigid lower part or bottom 7, able to contain the above-mentioned food component 3, for example raw vegetables or cold pasta, and a lid 8 which encloses such main food component 3 and the bottom 7.

In the present non-limiting example of realization, the bottom 7 and the closure lid 8 have substantially the shape of a tray with rectangular section and rounded edges and are joined to each other through a hinge 30 extended on a portion of a long side of the bottom 7 and of the lid 8. Alternatively, the hinge can be extended on a portion of a short side of the bottom 7 and of the lid 8.

More in particular, the bottom 7 comprises a longitudinal, flattened part 9 constituting the base thereof, from which long side walls 10 and short side walls 11 arise toward the upside which together with base 9 define a recess in which a main food component 3 to be packaged is placed. The long side walls 10 and the short side walls 11, which arise toward the upside from said base 9, end with a peripheral flange 12 substantially extended along the perimeter, the peripheral flange 12 protruding from the side walls 10 and 11, respectively long and short, towards the outside of the bottom 7.

On the peripheral flange 12 of the bottom 7 is provided a rib (or chord) 5 protruding upwards and extended along the whole perimeter of said peripheral flange 12.

The lid 8 has a top 16 from which long side walls 17 and short side walls 18 extend downwards and end in a peripheral flange 19 protruding toward the outside and substantially extended along the perimeter. On the peripheral flange 19 of the lid 8 a spline 21 protruding upwards and extended along the whole perimeter is formed as one-piece. In particular, such peripheral spline 21 is formed in (vertical) correspondence with the rib 15 on the peripheral flange 12 of the bottom 7 and has a substantially complementary shape to such rib 15 so that, when the first container 2 is closed, the peripheral flange 19 of the lid and the peripheral flange 12 of the bottom result to be overlapped and coupled by shape coupling between the complementary profiles of said rib 15 and said spline 21. Such shape coupling can in turn imply a joint coupling, a clutch coupling or the like.

Moreover, the peripheral flange 12 of the bottom 7 and the peripheral flange 19 of the lid 8 have, in correspondence with the opposed end parts of respective long sides faced to the other, one or more pairs of respective tabs 22, 23 protruding towards the outside and in staggered position with respect to each other so as to facilitate opening the first container by a user.

According to the present invention, the lid 8 of the first container 2 has a pair of cavities 25 with substantially rectangular section, said cavities 25 being formed at the top part 16 of the lid 8 towards the inside of the first container 2 and so that they are substantially flanked to each other on one side a separated by a tract 26 of the top part 16 of the lid 8.

The cavities 25 constitute housing compartment for respective second containers 4, of smaller size compared to container 2, said second containers being able to contain respective supplementary food component 5, 6. Such second containers 4 have each a bottom 27 having substantially the shape of a tray with rectangular section and rounded edges and a closure lid 28 which are joined to each other through a hinge 30 extended on a portion of a long side of the bottom 27 and of the lid 28. Alternatively, the hinge can be extended on a portion of a short side of the bottom 7 and of the lid 8.

The structural and functional features of the bottom 27 and the lid 28 constituting the second containers 4 are entirely similar to those of the bottom 7 and the lid 8 of the first container 2 and thus, hereinafter in the present description, they are not described in details for conciseness and the same reference numbers of corresponding features of bottom 7 an lid 8 of the first container 2 will be assigned to them. However, contrary to the lid 8 of the first container 2, the lid 28 of the second containers 4 is not provided with containment cavities and has, in this example of realization, a substantially flattened top portion 29 without lowered parts.

It is to notice that in variants of realization of the present invention the first container 2 and the second containers 4 can be realized with different forms and features from the ones depicted above, provided that the functionality of containment of the second containers in cavities obtained on the lid of the first container is preserved.

For example, the first container 2 and the second containers 4 can have a shape with square, circular or elliptic section-section instead of with rectangular section-section.

Moreover, the first container 2 and the second containers 4 can be not provided with connection hinge between the bottom and the closure lid. Furthermore, according to a variant of realization of the present invention (not depicted), the first container 2 and/or the second containers 4 can be provided with a tamper-evident system or mechanism such that a partial or total removal thereof or damage thereof is hint of tamper of said package. In such variant of realization, the hinge between the bottom and the lid can form part of the tamper-evident system of the respective container and the above-mentioned tabs 22, 23 on the peripheral flange of the bottom and on the peripheral flange of the lid can be formed on the same side or part where the hinge is formed, possibly close to the latter.

In fact, in the more general way, the first container and the second containers can each be simply realized with a tray bottom of any shape (for example with rectangular, square, circular cross-section etc.) and a closure lid applied on the upper rim of the bottom with any conventional system known in the art, for example with mechanisms of snap-fit coupling, joint coupling, coupling between complementary shapes, etc. Moreover, depending on contingent and specific needs, such as only as an example, the typology and preservation characteristics of the food to be packaged, the closure lid can also be applied as a seal so as to obtain a tight closure of the respective container and to be at the same time detachable from it at the time of the first opening of the container. For example, for the second containers, the closure lid could also be a simple gas-barrier film made of plastic material applied as a seal on the upper rim of the container and removable (peelable) from it at the time of the first opening of the container. Moreover, within the scope of the present invention, it is also possible that the closure lid for the first container and/or at least one of the second containers could comprise a gas-barrier film applied as a seal on the upper rim of the container and a closure lid above said gas-barrier film.

According to the present invention, the cavities 25 of the first container 2 are conformed so as to contain, at least partially, respective second containers 4. This can be achieved, for example, by shaping the cavities 25 with a shape that is substantially complementary to that of the bottom 27 of the respective containers 4 and with section size preferably slightly larger than that of the bottom 27 of the respective containers so as to accomplish a coupling substantially between complementary shapes upon inserting the second containers 4 with bottoms 27 in the respective cavities.

More in particular, in the present embodiment, each cavity 25 has a base 31 from which extend long side walls 32 and short side walls 33 ending at the top in a peripheral flange 34 extended along the perimeter, said peripheral flange being lowered compared to the top part 16 of the lid 8 of the first container 2. Advantageously, the base 31, the long side walls 32, the short side walls 33 and the upper peripheral flange 34 of a cavity 25 can be structured so as to have a shape substantially complementary to that of base 9, of the long side walls 10, of the short side walls 11 and of the lower peripheral flange 12 of the bottom 27 of a relative second container 4 respectively.

In this way, each second container 4 can advantageously be inserted in a respective cavity 25 and be kept in position with a coupling substantially between complementary shapes of the cavity 25 and the bottom 27 of said container 4. Depending on the size and the depth of the cavity 25, the insertion of the respective second container can complete, for example, upon reaching the end stop of the base 9 of the bottom 27 on the base 31 of the cavity 25 or upon reaching the end stop of the lower peripheral flange 12 of the bottom 27 of the second container 4 on the peripheral flange 34 of the respective cavity 25, achieving thereby a partial or substantially complete insertion of the bottom 27 of the second container 4 in the respective cavity 25.

Moreover, the lid 8 of the first container 2 has two grooves 35 formed as one-piece on the top part 16 of the lid 8, each groove 35 being formed in correspondence with a long side of a respective cavity 25 and being open or in other words faced towards said respective cavity 25. More in particular, each groove 35 extends downwards from the top 16 of the lid 8 to a height close to that of the peripheral flange 34 of the respective cavity 25 and involving also part of a long lateral wall 17 of the lid 8 so as to be open also to the outside of the first container 2. Furthermore, in this non-limitative embodiment, each groove 35 is substantially aligned to a long side of the respective cavity 25 and has a longitudinal extension substantially corresponding to that of said respective cavity 25.

In this way, the bottom 27 of a second container 4 can be inserted in the respective cavity 25 for example with the respective connection hinge 30 oriented toward the respective groove 35.

This advantageously facilitates the operations of grabbing the second containers 4 and their extraction from the respective cavities 25, in particular upon constitution of the food product ready for consumption as it will be better explained hereinafter in the description.

The package 1 according to the invention has also a pair of protuberances 42 formed as one-piece on the internal side of the lid 8 of the first container 2 (or grooves 42 if seen from the external side of the lid 8 of the first container 2), said protuberances 42 being conveniently separated so as to form between them a compartment for housing of a piece of cutlery 43, for example a fork. Advantageously, such piece of cutlery 43 can be kept in position in the designated compartment by tight-fit or snap-fit coupling between the above-mentioned protuberances 42.

It is to notice that in other embodiments of the present invention, the housing compartment for the piece of cutlery 43 (or more pieces of cutlery) can be absent or be provided external to the first container, namely for example the said protuberances 42 constituting housing compartment for the piece of cutlery 43 could be formed on the external side of the lid 8 or the bottom 7 of the first container. Alternatively, it is also envisaged the possibility to place an insert inside the container to support the piece of cutlery 43 and/or of sachet with liquid condiments like oil, vinegar or sauces.

With regard to the manufacture of the first container 2 and of the second containers 4, they can be obtained through conventional processes of plastic materials manufacturing, for example thermoforming. Plastic materials suitable for the manufacture of the above-mentioned containers are any plastic material suitable for containing food, in a compact rigid form or in expanded form with closed cells or with substantially open cells, preferably polyethylene terephthalate (PET), polypropylene (PP), polystyrene (PS) and copolymers thereof.

Advantageously, the first container 2 and the second containers 4 are made of a transparent plastic material so that the user or the consumer can visualize their contents.

Figure 4:
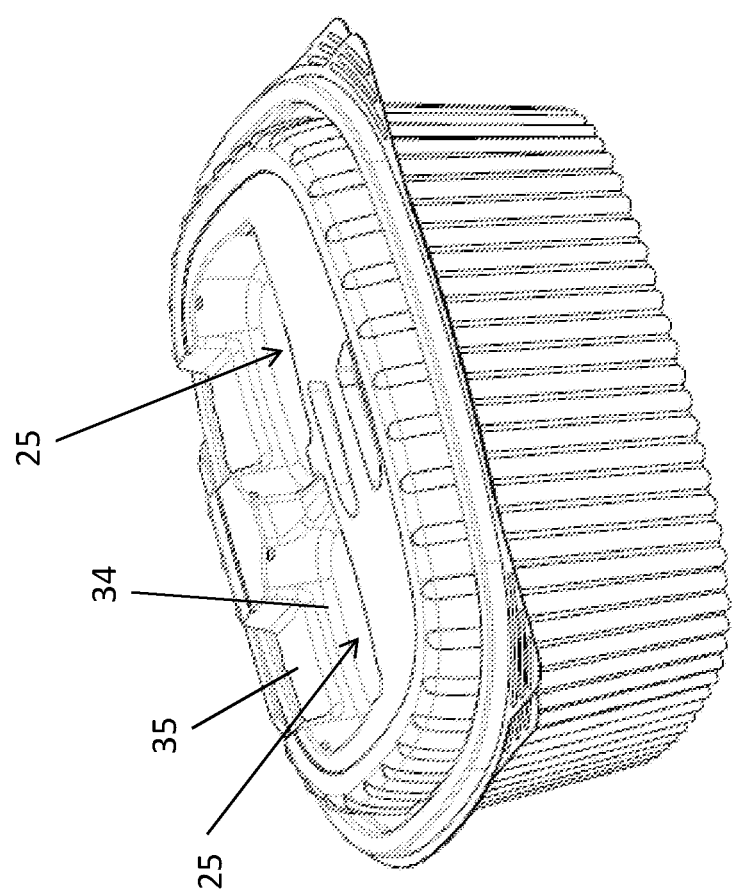
FIGS. 4 to 6 schematically show the respective steps of formation of a package according to the invention containing a main food component and supplementary food components packaged in respective containers and chosen for example according to the tastes of the end consumer.
Figure 5:
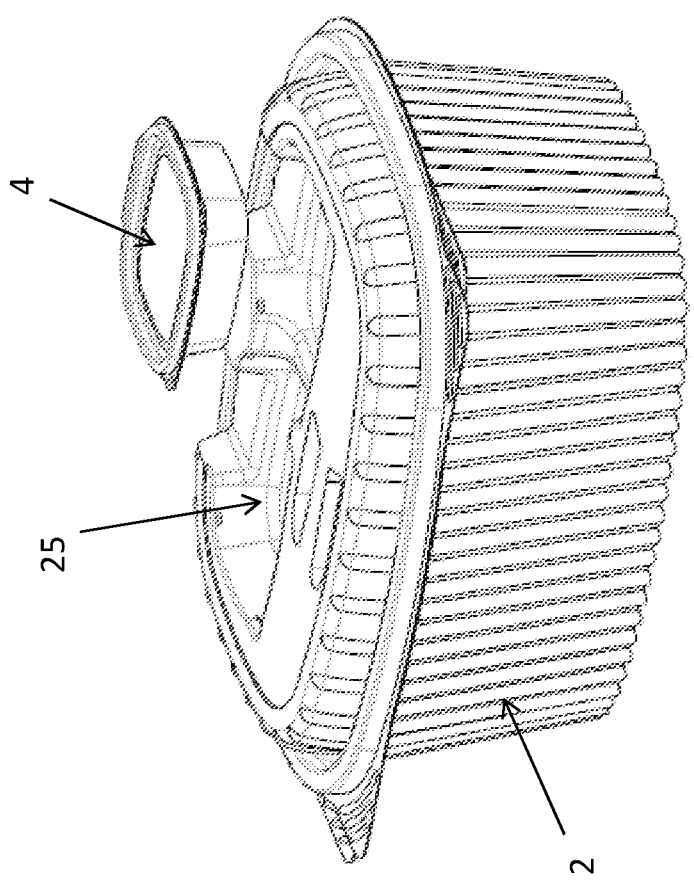
Figure 6:
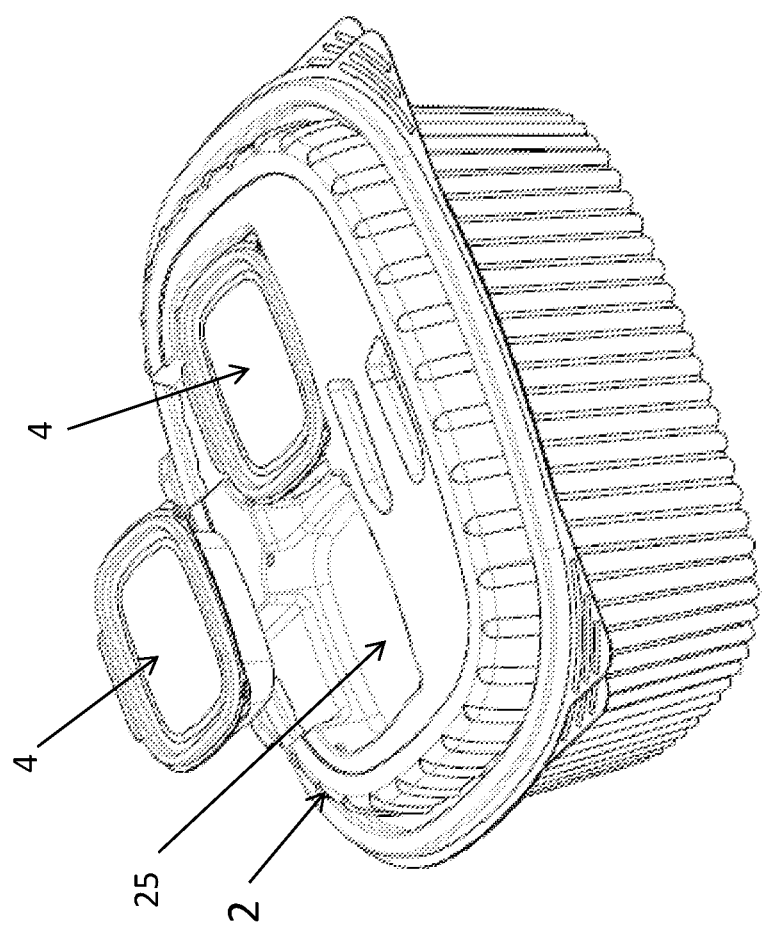

Referring now to FIGS. 4-6, the package 1 according to the invention can be created by the user or the consumer, for example upon purchase, simply combining to the first container 2 containing the main food component, for example raw vegetables or cold pasta, one or more second containers 4 containing the supplementary food components, such as for example meat or fish pieces. In this way, the user or consumer can advantageously have a much wide variety of packaged supplementary food components to combine to the main food component, also separately packaged, and especially can select such supplementary food components packaged independently one from the other and according to his/her tastes and desires.

For example, the user or consumer can advantageously combine to the main food component (for example vegetable) supplementary food components having nutritious features different from the ones of the main food component (for example meat or fish pieces and/or cereals like corn) so as to obtain a food or food product ready for consumption which non only corresponds to the own tastes but is also balanced from a nutritious point of view.

The above-mentioned combination is complete with the insertion of the second containers 4 containing the chosen supplementary food components in the cavities 25 of the first container 2 containing the main food component, obtaining thereby only one package 1 according to the invention as the whole. Due to the fact that the second containers 4 are at least partially inserted in the first container 2, the resulting whole package 1 is presented essentially as a "single piece" and consequently has the same advantages, at least concerning convenience in transporting and use of a similar package constituted by a single container and relative closure lid.

Referring now to figures from 7 to 10, modalities of opening the package according to the invention for the formation of the food product ready for consumption are shown.

Figure 7:
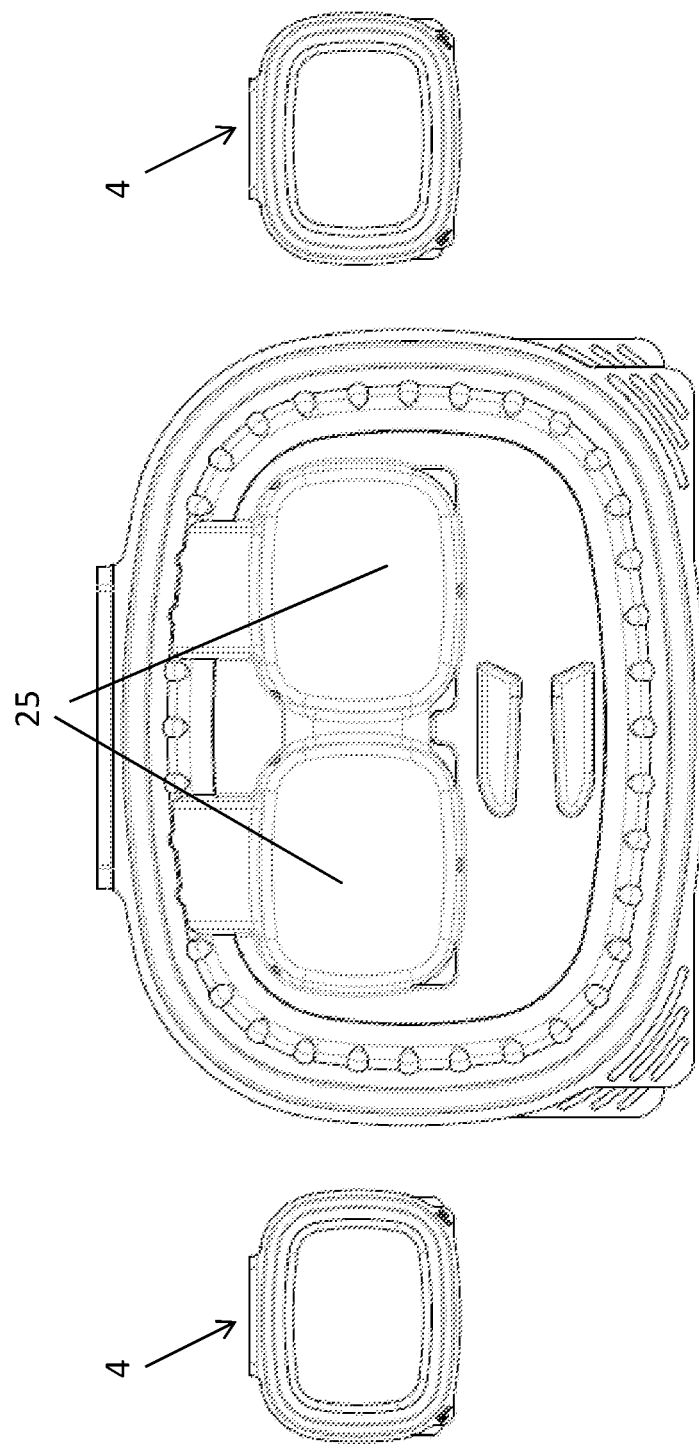
FIGS. 7 to 10 schematically show respective steps of opening the package according to the invention and formation of the food product ready for consumption by mixing the supplementary food components to the main food component.

First of all (FIG. 7), the user or consumer extracts the second containers 4 from the respective cavities 25 in the first container 2. In this regard, the user or consumer can easily grab the second containers 4 from the grooves 35 formed on the lid 8 of the first container 2.

Figure 8:
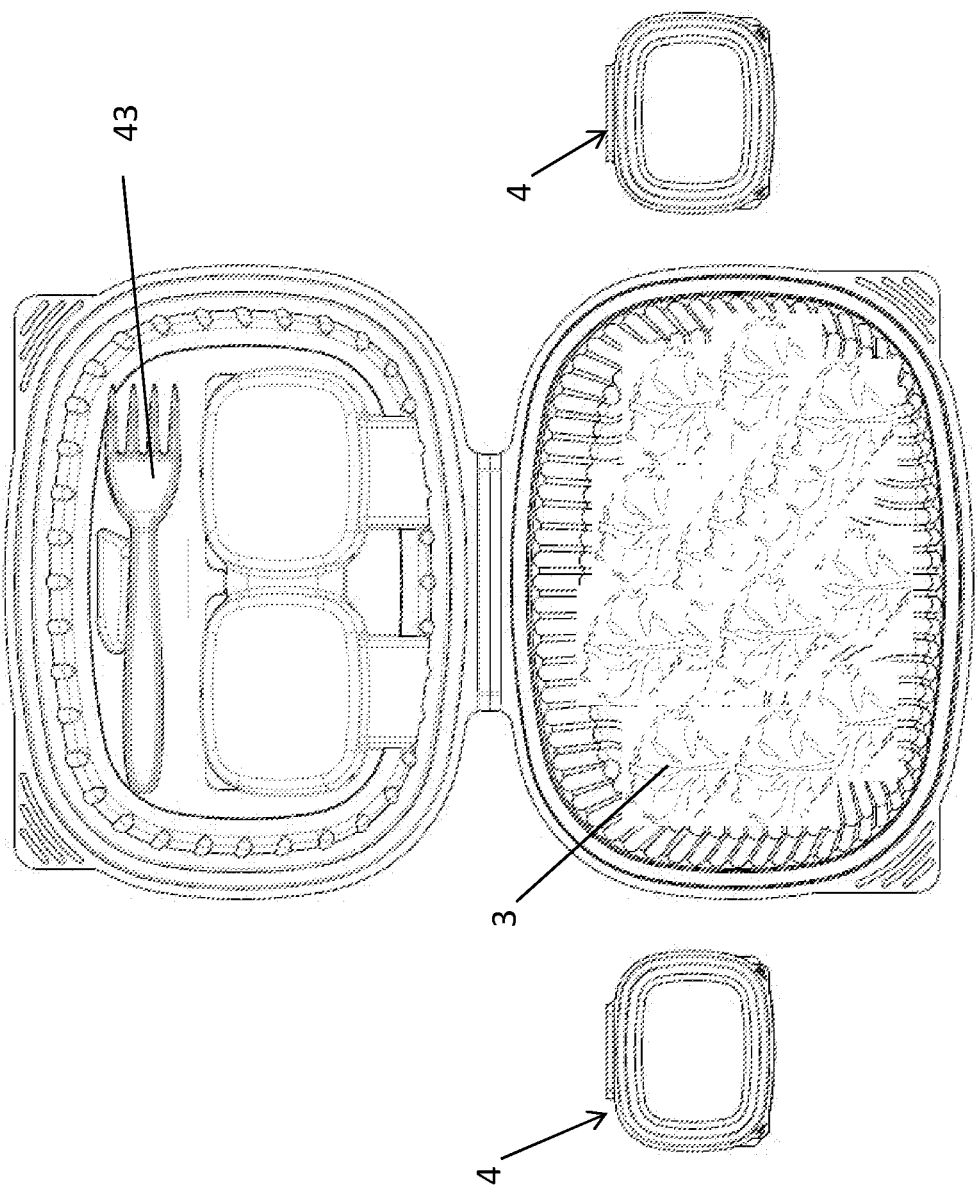

Subsequently (FIG. 8), the user or consumer opens the first container 2 by lifting up the lid 8, with the advantageous aid of the tabs 22 and 23 which are provided the bottom 7 and the lid 8 with, gaining access to the main food component therein contained.

Figure 9:
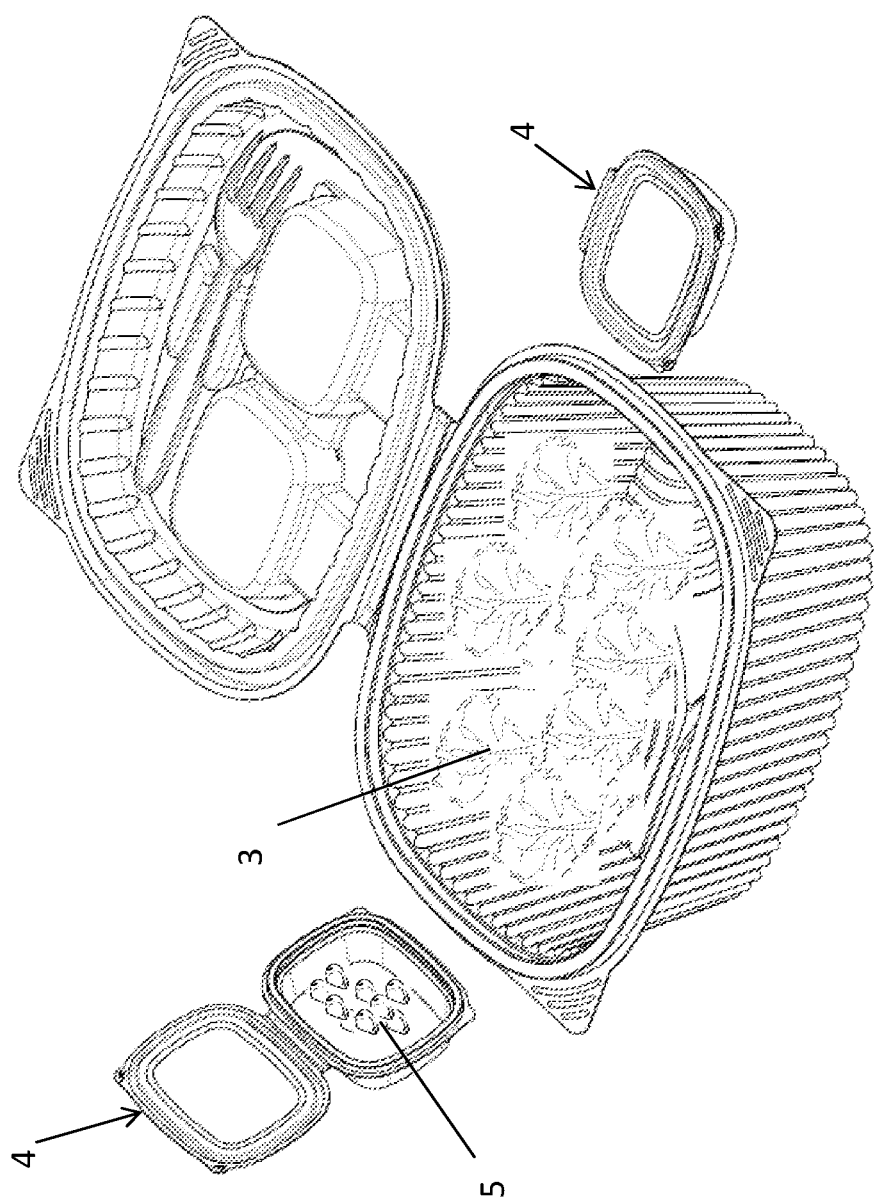
Figure 10:
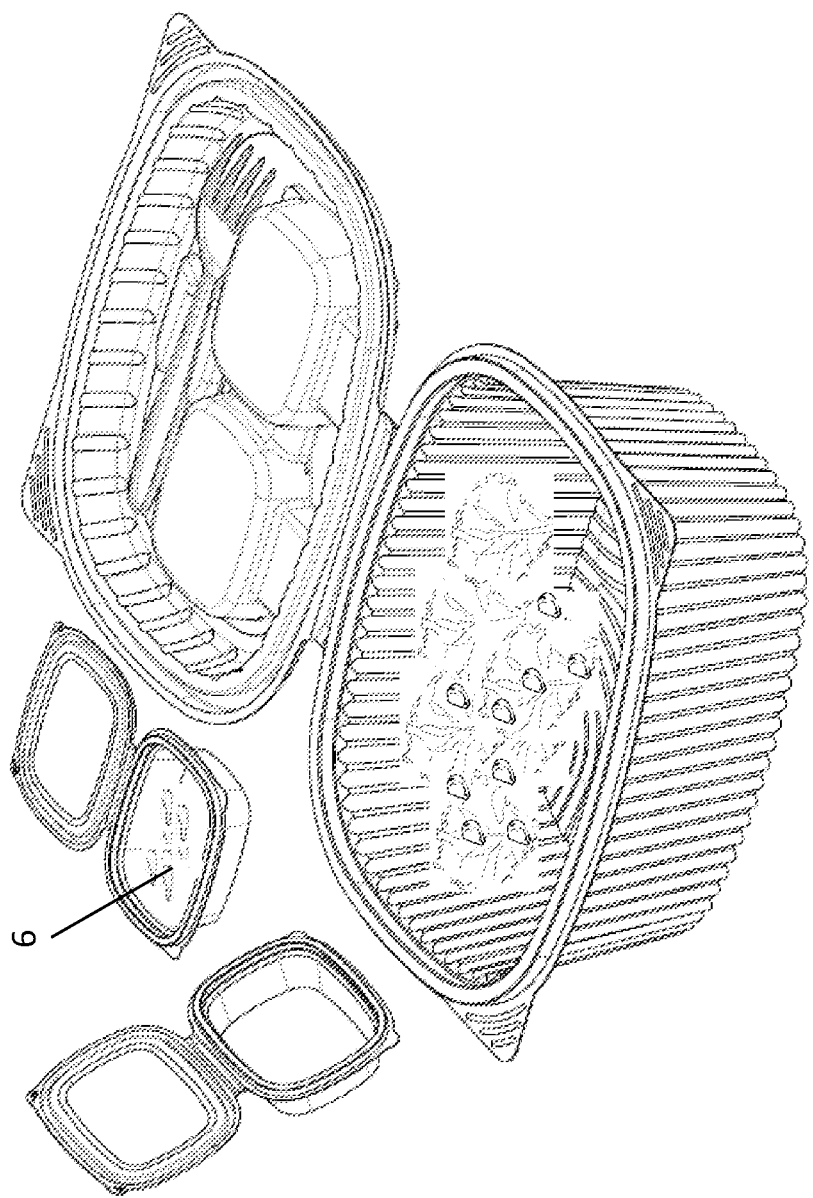

Then (FIGS. 9-10), the user or consumer opens the second containers 4 one by one with the same modality shown above for the first container 2 and pours the supplementary food components 5 and 6 contained therein in the first container 2 containing the main food component, constituting thereby the food product ready for consumption. Advantageously, adding one or more supplementary food components 5 and 6 in the first container 2 containing the main food component can be facilitated by using the piece of cutlery 43 provided with the main container 2 prior extraction of the piece of cutlery from the respective compartment between the internal protuberances 42.

The food product constituted in the main container 2 can then be consumed directly in such container 2 and with the aid of the provided piece of cutlery 43.

One of ordinary skill in the art could make many changes or variations to the package according to the invention for the purpose of satisfying contingent and specific needs, however without going out of the scope of protection of the enclosed claims.

For example, even if in the above depicted embodiments the containment cavities 25 of the second containers 4 are shown to be formed on the lid 8 of the first container 2, they can equally be formed on the long side walls 10 and/or short side walls 11 and/or on the base 9 of the bottom 7 of the first container providing specific recesses open to the outside in such parts of the bottom 7. The combination of at least one cavity 25 formed on the lid 8 and at least one cavity 25 formed on the bottom of the first container 2 also falls within the scope of the invention.

Moreover, it is to say that the package according to the invention can also comprise any containment system (for example by snap-fit coupling, by clip, etc.) to keep firmly and in removable manner the second containers 4 in the respective cavities 25 of the first container 2. Such containment systems are particularly useful in case of formation of one or more containment cavities 25 on the external side of the bottom 7 of the first container 2.

The invention claimed is:

1. A package made of plastic material for food or food products ready for consumption, comprising
    a first container of larger size, for a main food component, said first container comprising a first bottom and first closure lid having a top part surrounded by outer perimeter side walls, and
    a second container, of smaller size, able to separately contain a supplementary food component,
    said first container having a cavity open to the outside, formed on the top part of said first closure lid and conformed to constitute a housing compartment for said second container by at least partial insertion of said second container in said cavity of said first container, the cavity having a base and side walls,
    wherein said closure lid of the first container has a groove formed as one-piece with said top part of the lid, the groove being formed in correspondence with said cavity and the groove being open and faced towards the corresponding cavity involving a part of the side walls of the cavity and a part of the outer perimeter side walls of the lid of the first container so as to be also open to the outside of the first container from the outer perimeter side walls of the lid of the first container.

2. The package according to claim 1, wherein said cavity is formed on the external side of the top part of the first closure lid of said first container.

3. The package according to claim 1, wherein said second container comprises a second bottom and a second closure lid.

4. The package according to claim 3, wherein said cavity is formed on the top part of the first lid towards the inside of the first container, said cavity having a shape substantially complementary with that of the bottom of said second container to accomplish a coupling substantially between complementary shapes upon inserting said container in said cavity.

5. The package according to claim 1, wherein said first container and/or said second container are made of a plastic material that is compact rigid, expanded with closed cells or expanded with open cells selected from the group consisting of polyethylene terephthalate (PET), polypropylene (PP), polystyrene (PS) and their copolymers.

6. The package according to claim 1, comprising a compartment formed on said first bottom and/or on the lid of the first container, optionally on the inner side of it, for the housing of a piece of cutlery, said piece of cutlery being optionally inserted in said compartment of housing by snap-fit or tight-fit coupling.

7. The package according to claim 1, wherein in said first container and/or in said second container, said bottom has a peripheral flange extended towards the outside on which is formed a rib extended along the perimeter and protruding upwardly, and said lid has a peripheral flange on which is formed a spline protruding upwardly and extended along the perimeter, said peripheral spline being formed in correspondence with said rib and having a shape substantially complementary to that rib so that, when the first container and/or said second container is closed, said peripheral flange of the lid and said peripheral flange of the bottom are overlapped and coupled by the complementary profiles of said rib and said spline.

8. The package according to claim 7, wherein in said first container and/or in said second container, said peripheral flange of the bottom and/or said peripheral flange of the lid have a tab, optionally in said first container and/or in said second container, said peripheral flange of the bottom and said peripheral flange of the lid have a pair of respective tabs protruding towards the outside and in staggered position with respect to each other.

9. The package according to claim 8, wherein in said first container and/or in said second container, said peripheral flange of the bottom and said peripheral flange of the lid have, in correspondence with the opposed end parts of respective sides situated faced to the other, two pairs of respective tabs protruding towards the outside and in staggered position with respect to each other so as to facilitate opening said first container and/or said second container.

10. The package according to claim 1, wherein said first container and/or said second container is/are provided with a tamper-evident system or mechanism such that a partial or total removal thereof or damage thereof is hint of tamper of said package.

11. The package according to claim 1 wherein said first container and said second container are provided as a kit of components with said second container being detached from the first container and insertable in the latter.

* * * * *